(No Model.)

J. H. JANEWAY, Jr. & J. A. COREY.
CLIP.

No. 532,562. Patented Jan. 15, 1895.

WITNESSES:
Aubrey Love
F. W. Michtel

INVENTORS
John Howell Janeway Jr.
Joseph A. Corey

United States Patent Office.

JOHN HOWELL JANEWAY, JR., AND JOSEPH A. COREY, OF TRENTON, NEW JERSEY.

CLIP.

SPECIFICATION forming part of Letters Patent No. 532,562, dated January 15, 1895.

Application filed March 7, 1894. Serial No. 502,616. (No model.)

*To all whom it may concern:*

Be it known that we, JOHN HOWELL JANEWAY, Jr., and JOSEPH A. COREY, citizens of the United States, residing at Trenton, in the county of Mercer and State of New Jersey, have invented certain new and useful Improvements in Clips, of which the following is a specification.

Our invention relates to clips used for clamping and holding firmly together various objects such as wire ropes and the like; and the object of our invention is to provide a simple and effective clamping device or clip which may be readily and quickly adjusted or released.

Figure 1:
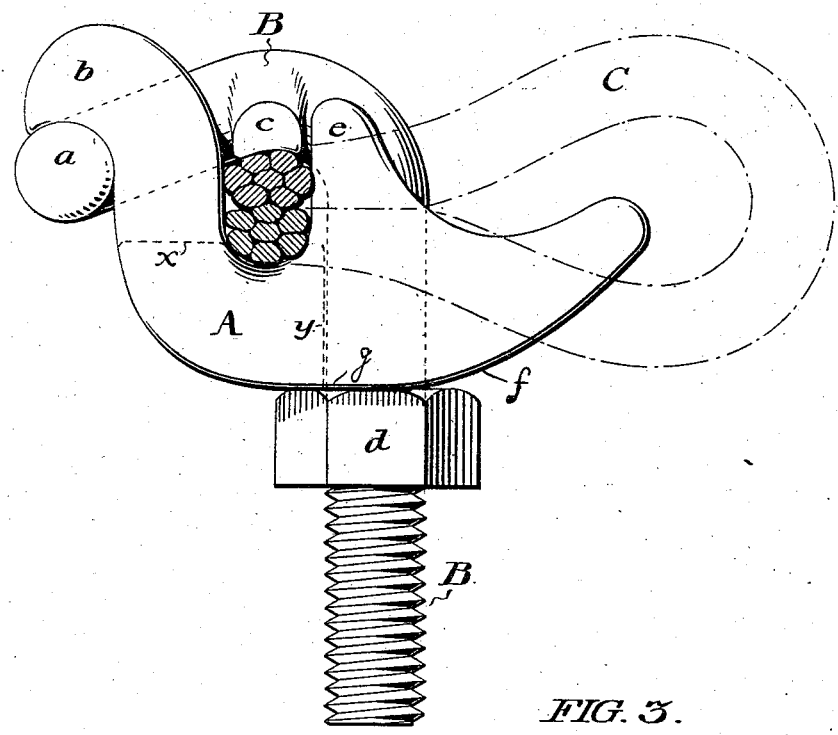
Figure 2:
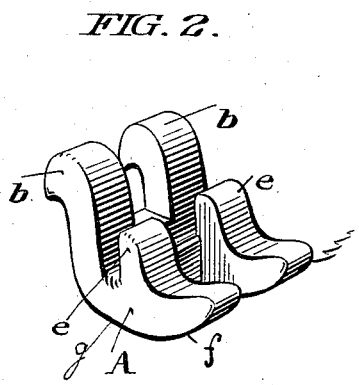
Figure 3:
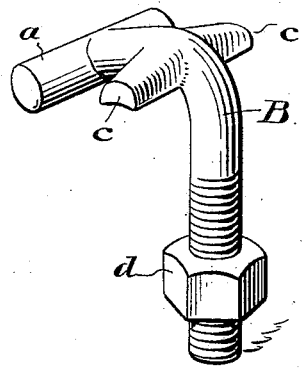

In the accompanying drawings forming a part of this specification, Figure 1. shows a side elevation of one of our clips clamped upon a looped wire cable. Fig. 2. is a perspective view of the frame or shoe of the clip, and Fig. 3. is a perspective view of the shank of the clip.

In the drawings A is a clamping member which we call the frame or shoe of the clip. B is a second clamping member which we call the "shank."

C is the rope or cable gripped by the clip, the said rope being shown in Fig. 1 in section, and also in outline by dotted lines.

*a* is the swivel bar of the shank, which bar is seated in bearings formed under the shoulders *b, b* of the shoe A, as shown in Fig. 1.

*c, c* are grooved wings or extensions projecting laterally from the curved neck of the shank.

*d* is a nut threaded to engage with the thread on the shank, and *e, e* are shoulders formed upon the upper side of the frame or shoe to assist in engaging and holding the ropes within the clip.

The lower face of the shoe opposite to the shoulders *e, e* is cam shaped, as shown at in Figs. 1 and 2, and the radii of the curve of the cam increase from the flattened face *g* of the cam directly opposite the shoulders *e, e* to the outer end of the cam faced portions of the shoe. The shoe is longitudinally slotted between the two shoulders *b, b*, the two shoulders *e, e* and through the cam faced portion thereof, as shown in Fig. 2, and in Fig. 1 by the dotted lines *x* and *y*.

In adjusting the clip to clamp and hold a splice of rope, the doubled rope is placed between the shoulders *e, e* and the bifurcations ending in the shoulders *b, b* as shown in Fig. 1. The swivel bar *a* of the shank B is then brought to its bearings under the shoulders *b, b* and the shank is turned over the rope until the threaded portion of the shank passes in between the bifurcated ends of the cam faced portion of the shoe. The screw nut *d* is then worked up the thread of the shank until its bearing face impinges against the cam face of the shoe, when a wrench is applied to drive it further up the thread of the shank. As the nut is screwed up the shank it is drawn down the face of the cam until it reaches its greatest and final bearing on the flattened face of the shoe opposite the shoulders *e, e*, when the shank is brought to the closed end of the slot between the bifurcations of the cam and assumes the position shown in Fig. 1.

The neck of the shank is so curved, and the wings *c, c* thereon are so proportioned, placed and grooved that when the nut *d* is brought to its final bearing the friction exerted by the shank and its wings upon the uppermost section of the rope held in the clip is practically equal to the friction produced by the shoe upon the undermost section of the rope held therein; and the entire adjustment is secured by the manipulation of a single screw nut; while it will be observed that the grip of the clip on the rope can not be released without unscrewing the nut *d* until it can be slipped up the cam face of the shoe and the shank passed out from the bifurcations of the shoe.

It will be obvious that the construction of our device may be variously modified without departing from the spirit of our invention, which, in its essence, is the combination of two clamping members which have reciprocal bearings upon which they hinge or turn relatively to each other whereby they are adjustable to each other and upon the object to be gripped by them by a cam action—for instance, the device for receiving and holding the object to be clamped may be formed on the shank itself instead of on the frame: a strictly hinged joint may be used to form the connection between the frame and the shank; and a cam may be formed on or attached to the shank instead of the frame. We do not, therefore, wish to be confined to the specific construction herein shown; but having thus shown and described our invention in the form in which we deem it most advantageously applicable to its most common use, we make the following claims on our invention.

We claim—

1. A clip consisting of two clamping members having reciprocal bearings whereon they hinge or turn relatively to each other, one of said clamping members having a cam face, the radii of the curve of said cam face increasing in length toward the end of the clamping member nearest which said cam face is placed, in combination with an adjustable bearing on the other of said clamping members adapted to traverse said cam face during process of adjustment, and impinge thereon; substantially as shown and described.

2. A clip consisting of two clamping members having reciprocal bearings whereon they hinge or turn relatively to each other, one of said clamping members having a cam face and contiguous thereto a flattened bearing, the radii of the curve of said cam face decreasing in length toward said flattened bearing, in combination with an adjustable bearing on the other of said clamping members adapted to traverse said cam face during process of adjustment and impinge on said flattened bearing of said first clamping member; substantially as shown and described.

3. A clip consisting of two clamping members having reciprocal bearings whereon they hinge or turn relatively to each other, one of said clamping members being hollowed or forked to receive and retain the object to be clamped, and having a cam face, the radii of the curve of said cam face increasing in length toward the end of the clamping member nearest which the cam face is placed, and the other of said clamping members having a threaded portion, in combination with a screw nut adjustable upon said threaded portion of said second clamping member and adapted to traverse said cam face during process of adjustment and to impinge thereon; substantially as shown and described.

4. A clip consisting of two clamping members having reciprocal bearings whereon they turn or hinge relatively to each other, one of said clamping members being hollowed or forked to receive and retain the object to be clamped, and having a cam face, and the other of said clamping members having a curved portion and lateral projections formed on said curved portion, and having a threaded end, in combination with a screw nut adapted to screw upon the threaded portion of said clamping member and bear upon the cam face of said first clamping member; substantially as shown and described.

5. A clip consisting of two clamping members having reciprocal bearings whereon they hinge or turn relatively to each other, one of said clamping members being hollowed or forked to receive and retain the object to be clamped, and having a cam face and a flattening bearing, and the other of said clamping members being curved and having grooved projections extending laterally from its curve and being threaded a portion of its length, in combination with a screw nut adapted to screw upon the threaded portion of said second clamping member and traverse said cam face and impinge upon said flattened bearing of said first clamping member; substantially as shown and described.

6. A clip consisting of two clamping members having reciprocal bearings whereon they turn or hinge relatively to each other, one of said clamping members being hollowed or forked to receive and retain the object to be clamped, and having a cam face and a flattened bearing and having a bifurcated end, the other of said clamping members having a curved portion and grooved lateral projections extending from said curved portion and having a threaded portion movable between the bifurcations of said first clamping member, in combination with a screw nut adapted to screw on the threaded portion of said second clamping member and traverse the cam face and impinge upon the flattened bearing of said first clamping member; substantially as shown and described.

JOHN HOWELL JANEWAY, JR.
JOSEPH A. COREY.

Witnesses:
AUBREY LOVE,
F. W. GNICHTEL.